United States Patent
Said

(10) Patent No.: US 10,455,244 B2
(45) Date of Patent: Oct. 22, 2019

(54) METHOD AND DEVICE FOR ENTROPY ENCODING OR ENTROPY DECODING VIDEO SIGNAL FOR HIGH-CAPACITY PARALLEL PROCESSING

(71) Applicant: LG ELECTRONICS INC., Seoul (KR)

(72) Inventor: Amir Said, San Jose, CA (US)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 15/526,847

(22) PCT Filed: Nov. 16, 2015

(86) PCT No.: PCT/KR2015/012297
§ 371 (c)(1),
(2) Date: May 15, 2017

(87) PCT Pub. No.: WO2016/076677
PCT Pub. Date: May 19, 2016

(65) Prior Publication Data
US 2017/0359591 A1 Dec. 14, 2017

Related U.S. Application Data

(60) Provisional application No. 62/079,564, filed on Nov. 14, 2014.

(51) Int. Cl.
*H04N 19/436* (2014.01)
*H04N 19/44* (2014.01)
*H04N 19/13* (2014.01)
*H04N 19/176* (2014.01)

(52) U.S. Cl.
CPC .......... *H04N 19/436* (2014.11); *H04N 19/13* (2014.11); *H04N 19/176* (2014.11); *H04N 19/44* (2014.11)

(58) Field of Classification Search
None
See application file for complete search history.

(56) References Cited

U.S. PATENT DOCUMENTS

| 8,379,718 B2 * | 2/2013 | Wang ..................... H04N 19/50 |
| | | 375/240.12 |
| 8,494,059 B1 | 7/2013 | Guan et al. |
| 10,313,174 B2 * | 6/2019 | Zhu ..................... H04L 27/2698 |
| 2002/0172429 A1 * | 11/2002 | Boliek ..................... H03M 7/30 |
| | | 382/240 |

(Continued)

FOREIGN PATENT DOCUMENTS

| JP | 2006-525731 | 11/2006 |
| JP | 2007-214998 | 8/2007 |

(Continued)

*Primary Examiner* — Mohammad J Rahman
(74) *Attorney, Agent, or Firm* — Fish & Richardson P.C.

(57) ABSTRACT

Disclosed is a method for encoding a video signal using parallel implementations, including generating data symbols to be encoded, encoding $1^{st}$ data symbols being in a base segment, copying $2^{nd}$ data symbols being in another segment to a buffer, and encoding in parallel the $2^{nd}$ data symbols being in the another segment.

10 Claims, 18 Drawing Sheets

(56) References Cited

U.S. PATENT DOCUMENTS

| | | | | |
|---|---|---|---|---|
| 2004/0151252 A1* | 8/2004 | Sekiguchi | ............... | H03M 7/40 375/240.25 |
| 2006/0233254 A1* | 10/2006 | Lee | ........................ | H04N 19/70 375/240.16 |
| 2007/0120712 A1* | 5/2007 | Cai | ........................ | H04N 19/647 341/51 |
| 2009/0245349 A1* | 10/2009 | Zhao | ........................ | H04N 19/70 375/240.03 |
| 2010/0098155 A1* | 4/2010 | Demircin | ............ | H03M 7/4006 375/240.02 |
| 2012/0014457 A1* | 1/2012 | He | ........................ | H04N 19/13 375/240.25 |
| 2012/0044099 A1* | 2/2012 | Sekiguchi | ............... | H03M 7/40 341/107 |
| 2012/0081241 A1* | 4/2012 | Misra | ................. | H03M 7/4093 341/107 |
| 2012/0189049 A1* | 7/2012 | Coban | ................. | H04N 19/197 375/240.02 |
| 2015/0010056 A1* | 1/2015 | Choi | .................... | H04N 19/176 375/240.02 |
| 2018/0019905 A1* | 1/2018 | Zhu | ...................... | H04B 7/0452 |

FOREIGN PATENT DOCUMENTS

| | | | | |
|---|---|---|---|---|
| KR | 1020100138425 | | 12/2010 | |
| KR | 10-2011-0047700 | | 5/2011 | |
| KR | 1020110066523 | | 6/2011 | |
| KR | 1020120004319 | | 1/2012 | |
| KR | 10-2013-0085389 | | 7/2013 | |
| KR | 10-2013-0086004 | | 7/2013 | |
| WO | WO-2004098198 A1 * | | 11/2004 | ............. H04N 19/61 |

* cited by examiner

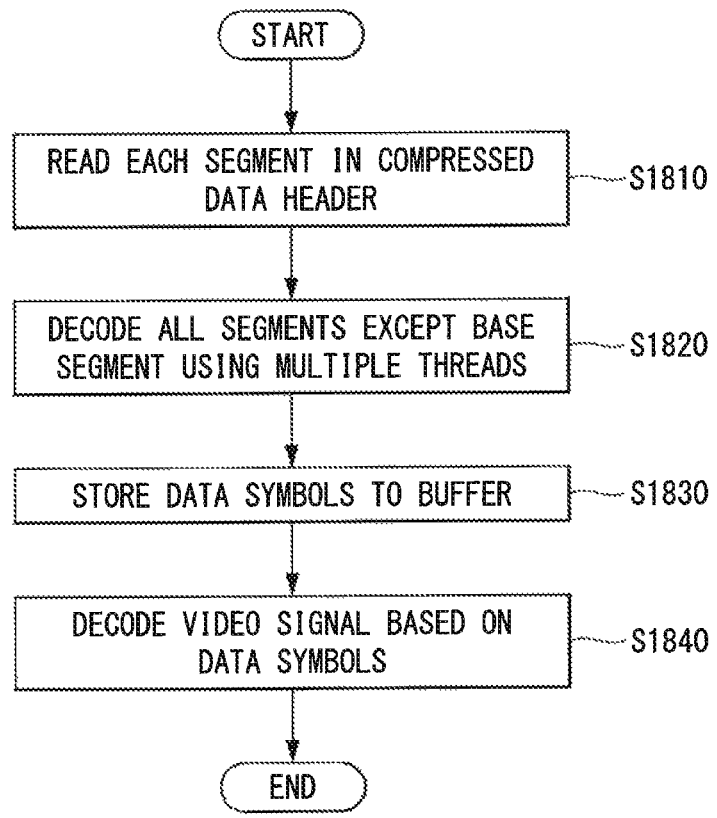

METHOD AND DEVICE FOR ENTROPY ENCODING OR ENTROPY DECODING VIDEO SIGNAL FOR HIGH-CAPACITY PARALLEL PROCESSING

CROSS-REFERENCE TO RELATED APPLICATIONS

This application is the National Stage filing under 35 U.S.C. 371 of International Application No. PCT/KR2015/012297, filed on Nov. 16, 2015, which claims the benefit of U.S. Provisional Applications No. 62/079,564, filed on Nov. 14, 2014, the contents of which are all hereby incorporated by reference herein in their entirety.

TECHNICAL FIELD

The present invention relates to a method and apparatus of entropy-encoding or entropy-decoding a video signal for high throughput parallel implementations and, more particularly, to a technique of adapting a segment entropy IS coding method to a hardware dataflow architecture.

BACKGROUND ART

Entropy coding is the process of representing data with the smallest average number of bits, and thus is a fundamental technique on all media compression methods. Arithmetic coding is an entropy coding method that has higher computational complexity than other coding techniques like prefix-coding (e.g., Huffman, Rice, exp-Golomb codes), but since it yields better compression, it has been adopted as the unique entropy coding method in the recent video coding standards H.265/HEVC and VP9, and thus is expected to be the sole entropy coding method of future standards.

However, in a video coding standard, a bit syntax of mapped to pseudo-random selection of finite-state-machines (FSM), which removes a possibility of parallel implementations regarding increasing throughput, is defined to severely limit data throughput of video encoding/decoding.

Thus, in order to allow for extended parallelization, a segmented bit format is required to be defined, and here, a data segment is defined by an independent entropy coding FSM that may be processed in parallel at an end portion of a coding process or at a start portion of decoding. This approach, however, may be appropriate for execution of software in a general processor because thread management or communication overheads may be avoided, but may not be optimal for general hardware in which overhead is not significant and processed elements are required to be temporarily in an idle state.

DISCLOSURE

Technical Problem

An aspect of the present invention provides a method for applying a segment entropy-coding access to a hardware dataflow architecture.

Another aspect of the present invention provides an entropy coding method for optimally compressing a video signal, as well as obtaining high data throughput.

Another aspect of the present invention shows how machine states can be untangled by changing a method of structuring compressed data using a form of data segmentation.

Another aspect of the present invention provides a parallel implementation method removing inessential data dependency.

Another aspect of the present invention provides flexibility of data processing and allows for parallel implementations in a larger scale through segment entropy coding in which compressed data is stored in split data segments.

Another aspect of the present invention is to design a system which considers a cache operation to reduce memory cost of buffers.

Another aspect of the present invention provides an encoder capable of starting non-blocking processing of data immediately when data is allocated to a data segment, or adding a short queue for follow-up processing.

Technical Solution

According to an aspect of the present invention, there is provided a method for applying a segment entropy coding access to a hardware data flow architecture, thus optimally perform video signal compression together with data throughput.

According to another aspect of the present invention, there is provided a method for structuring compressed data using a form of data segmentation.

According to another aspect of the present invention, there is provided a parallel implementation method for removing unessential data dependency.

According to another aspect of the present invention, there is provided a segment entropy coding method for storing compressed data in split data segments.

According to another aspect of the present invention, there is provided a method for design a system in consideration of a cache operation to reduce costs for a memory of buffers.

According to another aspect of the present invention, there is provided a method for solving an excessive data buffer problem by substituting a large buffer of an encoder and a decoder with a small data queue.

According to another aspect of the present invention, there is provided a more general system for segment entropy coding by changing blocks representing data models (MOD) into blocks representing FSMs.

Advantageous Effects

According to embodiments of the present invention, since a method for applying a segment entropy coding access to a hardware dataflow architecture is provided, video signal compression, as well as data throughput, may be optimally performed.

Also, since the segment entropy coding access is applied to the hardware dataflow architecture and a queue is used for processing elements to control entropy-encoding and entropy-decoding, the encoder may perform a main decoding process in parallel and a decoder may not be required to finish every entropy-decoding before the main decoding process starts.

Also, since FAM is used and a state space of a large scale is used, high data throughput may be obtained and compression may be optimally performed.

Also, since a system considering a cache operation is designed, memory cost of buffers may be reduced.

Also, since large buffers of the encoder and the decoder are replaced with an even smaller data queue, an excessive data buffering problem may be solved.

DESCRIPTION OF DRAWINGS

FIG. 18 is a flow chart illustrating a method for decoding a video signal on the basis of parallel implementations according to an embodiment to which the present invention is applied.

BEST MODES

Figure 1:
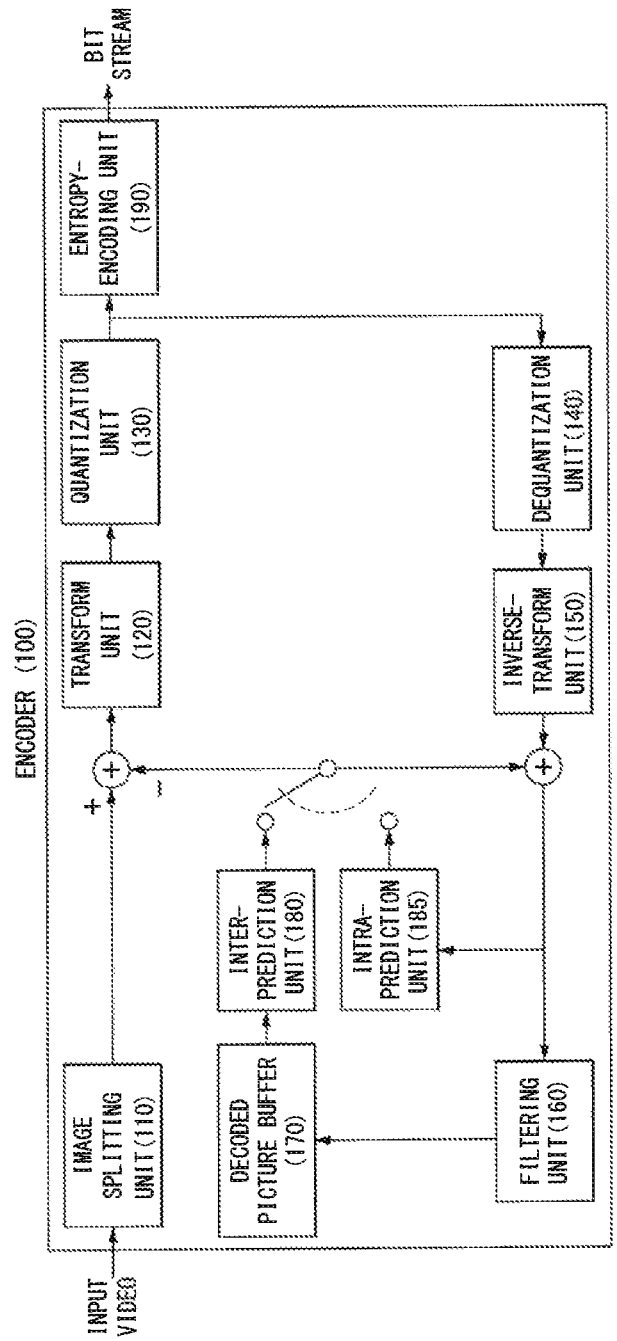
FIG. 1 is a schematic block diagram of an encoder encoding a video signal according to an embodiment to which the present invention is applied.

The present invention provides a method for encoding a video signal using parallel implementations, including: generating data symbols to be encoded; encoding $1^{st}$ data symbols being in a base segment; copying $2^{nd}$ data symbols being in another segment to a buffer; and encoding in parallel the $2^{nd}$ data symbols being in the another segment.

Also, in the present invention, a load-balancing algorithm may be used for assigning segments to different threads.

Also, in the present invention, the method may further include: creating a compressed data header when all data has been compressed, wherein the compressed data header includes an index of each segment.

Also, in the present invention, the method may further include: concatenating all segments to create a single data array.

Also, in the present invention, a non-blocking process may start when assigned to a data segment.

The present invention also provides a method for decoding a video signal based on parallel implementations, including: reading each segment in a compressed data header; decoding all segments except a base segment using multiple threads; storing data symbols in a buffer; and processing the video signal based on the data symbols.

Also, in the present invention, if the data symbols exist in the base segment, the data symbols in the base segment may be decoded.

Also, in the present invention, wherein if the data symbols do not exist in the base segment, the data symbols may be read from a corresponding buffer.

The present invention also provides an apparatus for encoding a video signal using parallel implementations, including: a data symbol generation unit configured to generate data symbols to be encoded; a series processing unit configured to encode $1^{st}$ data symbols being in a base segment; and a parallel processing unit configured to copy $2^{nd}$ data symbols being in another segment to a buffer and encoding in parallel the $2^{nd}$ data symbols being in the another segment.

Also, the present invention, the apparatus may further include: a data bit array generation unit configured to generate a compressed data header when all data has been compressed, wherein the compressed data header includes an index of each segment.

Also, in the present invention, the data bit array generation unit may concatenate all segments to create a single data array.

The present invention also provides an apparatus for decoding a video signal based on parallel implementations, including: a parallel processing unit configured to read each segment in a compressed data header, decode all segments except a base segment using multiple threads, and store data symbols in a buffer; and a decoding unit decoding the video signal based on the data symbols.

[Mode for Invention]

Hereinafter, exemplary elements and operations in accordance with embodiments of the present invention are described with reference to the accompanying drawings. It is however to be noted that the elements and operations of the present invention described with reference to the drawings are provided as only embodiments and the technical spirit and kernel configuration and operation of the present invention are not limited thereto.

Furthermore, terms used in this specification are common terms that are now widely used, but in special cases, terms randomly selected by the applicant are used. In such a case, the meaning of a corresponding term is clearly described in the detailed description of a corresponding part. Accordingly, it is to be noted that the present invention should not be construed as being based on only the name of a term used in a corresponding description of this specification and that the present invention should be construed by checking even the meaning of a corresponding term.

Furthermore, terms used in this specification are common terms selected to describe the invention, but may be replaced with other terms for more appropriate analysis if such terms having similar meanings are present. For example, a signal, data, a sample, a picture, a frame, and a block may be properly replaced and interpreted in each coding process. Also, partitioning, decomposition, splitting, division, and the like, may also be appropriately replaced to be interpreted in each coding process.

FIG. 1 is a schematic block diagram of an encoder encoding a video signal according to an embodiment to which the present invention is applied.

Referring to FIG. 1, an encoder 100 includes a video splitting unit 110, a transform unit 120, a quantization unit 130, a dequantization unit 140, a inverse-transform unit 150, a filtering unit 160, a decoded picture buffer (DPB) 170, an inter-predicting unit 180, an intra-predicting unit 185, and an entropy-encoding unit 190.

The video splitting unit 110 may split an input video (or a picture frame) input to the encoder 100 into one or more processing units. For example, the one or more processing units may be a coding tree unit (CTU), a coding unit (CU), a prediction unit (PU), or a transform unit (TU).

However, these terms are merely used for the purposes of description of the present invention and the present invention is not limited to the definition of the corresponding terms. Also, in this disclosure, for the purposes of description, a term of coding unit is used as a unit used in a process of encoding or decoding a video signal, but the present invention is not limited thereto and the coding unit may be appropriately interpreted according to contents of the invention.

The encoder 100 may generate a residual signal by subtracting a prediction signal output from an inter-prediction unit 180 or an intra-prediction unit 185 from the input video signal, and the generated residual signal is transmitted to the transform unit 120.

The transform unit 120 may generate a transform coefficient by applying a transform technique to the residual signal. A transform process may be applied to a pixel block which has a square shape and has the same size or may be applied to a block which does not have a square shape and has a varied size.

Figure 2:
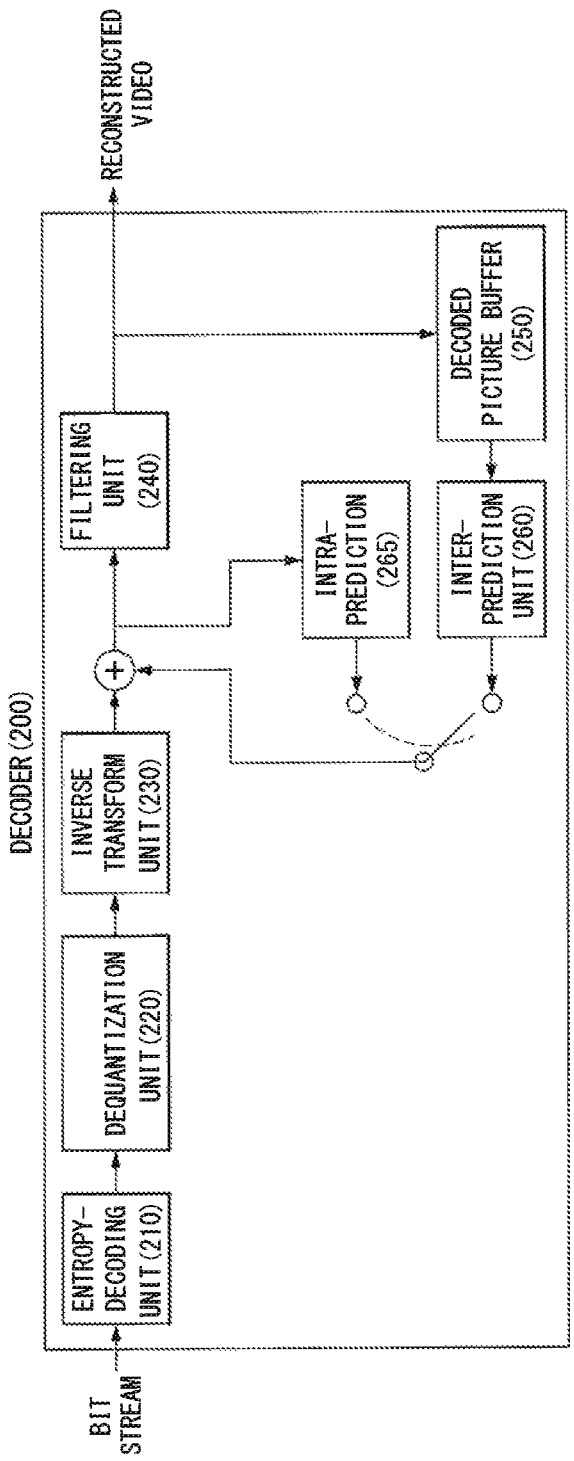
FIG. 2 is a schematic block diagram of a decoder decoding a video signal according to an embodiment to which the present invention is applied.

The quantization unit 130 may quantize the transform coefficient and transmit the quantized transform coefficient to the entropy-encoding unit 190, and the entropy-encoding unit 190 may entropy-code a quantized signal and output the coded signal as a bit stream. Details of the entropy-encoding unit 190 will be described when an entropy-decoding unit of FIG. 2 is described.

The quantized signal output from the quantization unit 130 may be used to generate a prediction signal. For example, the quantized signal may be dequantized and inverse-transformed by the dequantization unit 140 and the inverse-transform unit 150 to reconstruct a residual signal. The reconstructed residual signal may be added to the prediction signal output from the inter-prediction unit 180 or the intra-prediction unit 185 to generate reconstructed signal.

Meanwhile, as the adjacent blocks are quantized by different quantization parameters during the forgoing compression process, a degradation of making a block boundary visible may occur. This phenomenon is called blocking artifacts, and it is one of important factors evaluating image quality.

In order to reduce such a degradation, a filtering process may be performed. Through such a filtering process, the blocking artifacts may be removed and an error regarding a current picture may be reduced to enhance image quality.

The filtering unit 160 may perform filtering on the reconstructed signal and output the filtered signal to a playback device or transmit the same to the decoded picture buffer 170. The filtered signal transmitted to the decoded picture buffer 170 may be used as a reference picture in the inter-prediction unit 180. In this manner, since the filtered picture is used as a reference picture in an inter-prediction mode, coding efficiency, as well as image quality, may be enhanced.

The decoded picture buffer 170 may store the filtered picture such that the filtered picture may be used as a reference picture in the inter-prediction unit 180.

The inter-prediction unit 180 may perform temporal prediction and/or spatial prediction to remove temporal redundancy and/or spatial redundancy with reference to the reconstructed picture. Here, the reference picture used to perform prediction is a signal which has been transformed through quantization and dequantization by blocks when encoding/decoding was performed previously, and thus, blocking artifact or ringing artifact may exist.

Thus, in order to solve a degradation of performance due to discontinuity or quantization of the signal, the inter-prediction unit 180 may apply a low-pass filter (LPF) to interpolate a signal between pixels by subpixels. Here, the subpixel refers to a virtual pixel generated by applying an interpolation filter, and an integer pixel refers to a real pixel present in a reconstructed picture. As interpolation, linear interpolation, bi-linear interpolation, wiener filter, and the like, may be applied.

The interpolation filter may be applied to the reconstructed picture to enhance precision of prediction. For example, the inter-prediction unit 180 may apply an interpolation filter to an integer pixel to generate an interpolated pixel, and perform prediction using an interpolated block including interpolated pixels, as a prediction block.

The intra-prediction unit 185 may perform a current block with reference to samples around a block to be currently coded. The intra-prediction unit 185 may perform the following process to perform intra-prediction. First, the intra-prediction unit 185 may prepare a reference sample required for generating a prediction signal. Next, the intra-prediction unit 185 may generate a prediction signal using the prepared reference sample. Thereafter, the intra-prediction unit 185 encodes a prediction mode. Here, the reference sample may be prepared through reference sample padding and/or reference sample filtering. Since the reference sample has undergone the prediction and reconstructing process, it may include a quantization error. Thus, in order to reduce such an error, a reference sample filtering process may be performed on each prediction mode used for intra-prediction.

The prediction signal generated through the inter-prediction unit 180 or the intra-prediction unit 185 may be used to generate a reconstructed signal or a residual signal.

FIG. 2 is a schematic block diagram of a decoder decoding a video signal according to an embodiment to which the present invention is applied.

Referring to FIG. 2, a decoder 200 may include an entropy-decoding unit 210, a dequantization unit 220, a inverse-transform unit 230, a filtering unit 240, a decoded picture buffer (DPB) 250, an inter-prediction unit 260, and an intra-prediction unit 265.

A reconstructed video signal output through the decoder 200 may be played through a playback device.

The decoder 200 may receive a signal output from the encoder 100 of FIG. 1, and the received signal may be entropy-decoded through the entropy-decoding unit 210.

The entropy-decoding unit 210 serves to parse and decode the received signal and output a syntax element such as a prediction mode, a video parameter, or residual data. For example, the entropy-decoding unit 210 may include context-based adaptive binary arithmetic coding (CABAC), and the CABAC may receive the syntax element information and parameter information for decoding the syntax element information and calculate a syntax-based generation probability in a context adaptive binary arithmetic coding manner, and sequentially decode an input signal to output a value of a syntax element.

The decoder 200 may generate a prediction signal on the basis of the prediction vector information. This may be performed in the inter-prediction unit 260 but the present invention is not limited thereto.

The dequantization unit 220 obtains a transform coefficient from the entropy-decoded signal using quantization step size information. Here, the obtained transform coefficient may be a coefficient to which various embodiments described above regarding the transform unit 120 of FIG. 1 are applied.

The inverse-transform unit 230 may inverse-transform the transform coefficient to obtain a residual signal.

The obtained residual signal is added to the prediction signal output from the inter-prediction unit 260 or the intra-prediction unit 265 to generate a reconstructed signal.

The filtering unit 240 may perform filtering on the reconstructed signal and output the filtered signal to a playback device or transmit the same to the decoded picture buffer unit 250. The filtered signal transmitted to the decoded picture buffer unit 250 may be used as a reference picture in the inter-prediction unit 260.

In this disclosure, the embodiments described above regarding the filtering unit 16, the inter-prediction unit 180, and the intra-prediction unit 185 of the encoder 100 may also be applied to the filtering unit 240, the inter-prediction unit 260, and the intra-prediction unit 265 of the decoder 200 in the same manner.

Figure 3:
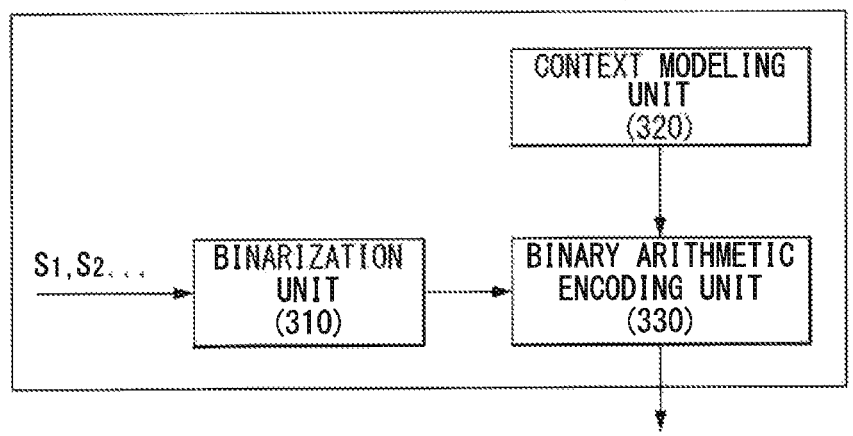
FIGS. 3 and 4 are schematic block diagrams of an entropy-encoding unit and an entropy-decoding unit processing a video signal according to embodiments to which the present invention is applied.
Figure 4:
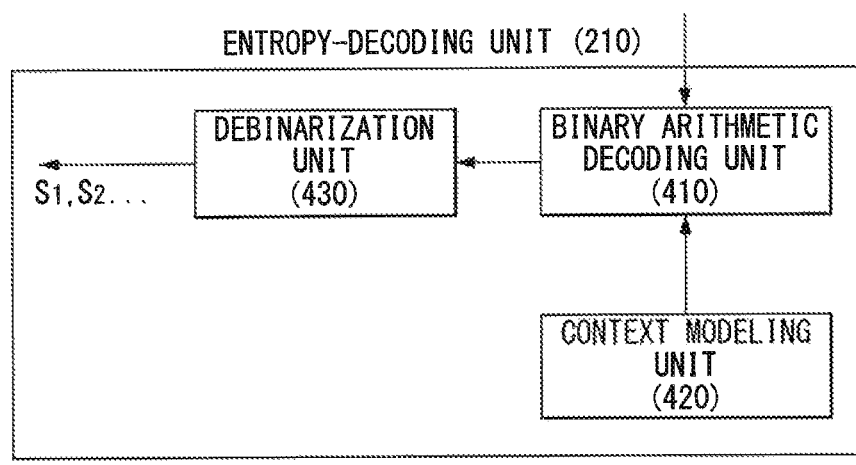

FIGS. 3 and 4 are schematic block diagrams of an entropy-encoding unit and an entropy-decoding unit processing a video signal according to embodiments to which the present invention is applied.

Referring to FIG. 3, the entropy-decoding unit 190 includes a binarization unit 310, a context modeling unit 320, and a binary arithmetic encoding unit 330.

The binarization unit 310 may receive a sequence of data symbols and perform binarization thereon to output a binary symbol (bin) string including a binarized value of 0 or 1. The binarization unit 310 may map syntax elements to binary symbols. Various different binarization processes, e.g., unary (U), truncated unary (TU), k-order Exp-Golomb (EGk), and fixed length processes, and the like, may be used for binarization. The binarization process may be selected on the basis of a type of a syntax element.

The output binary symbol string is transmitted to the context modeling unit 320. The context modeling unit 320 performs probability evaluation on entropy-coding. That is, the context modeling unit 320 may evaluate a probability of the bins.

The context modeling unit 320 may provide accurate probability estimation required for obtaining high coding efficiency. Thus, different context models may be used for different binary symbols, and a probability of the context models may be updated on the basis of values of previously coded binary symbols.

Binary symbols having a similar distribution may share the same context model. A context model regarding each binary symbol may be selected on the basis of at least one of a type of a syntax element, a position of a binary symbol (binIdx) in a syntax element, luminance/chrominance (luma/chroma), and adjacent information.

The binary arithmetic encoding unit 330 performs entropy-encoding on the output string and outputs compressed data bits.

The binary arithmetic encoding unit 330 performs arithmetic coding on the basis of recursive interval division.

An interval (or a range), with an initial value of 0 to 1, is divided into two subintervals based on the probability of the bin. The encoded bits provide an offset that, when converted to a binary fraction, selects one of the two subintervals, which indicates the value of the decoded bin.

After every decoded bin, the interval may be updated to equal the selected subinterval, and the interval division process repeats itself. The interval and offset have limited bit precision, so renormalization may be required whenever the interval falls below a specific value to prevent underflow. The renormalization can occur after each bin is decoded.

Arithmetic coding can be done using an estimated probability, or assuming equal probability of 0.5. For bypass coded bins, the division of the range into subintervals can be done by a shift, whereas a look up table may be required for the context coded bins.

Meanwhile, referring to FIG. 4, the entropy-decoding unit 210 includes a binary arithmetic decoding unit 410, a context modeling unit 420, and a debinarization unit 430.

The context modeling unit 420 selects probability information required for decoding a current bit stream from a context memory and provides the selected probability information to the binary arithmetic decoding unit 410. The context memory includes a context model defined in units of bin of a syntax element. Here, the context model indicates generation probability information of binary numbers MPS and LPS in accordance with a context.

The context modeling unit 420 selects a context memory through syntax element information to be decoded, and selectively outputs probability information required for decoding the current syntax element through bit index information as decoding order of bins therein.

The debinarization unit 430 serves to receive bins in a binary form decoded by the binary arithmetic decoding unit 410, collect the bins, transforms the collected bins into an integer type syntax element value, and output the same.

Figure 5:
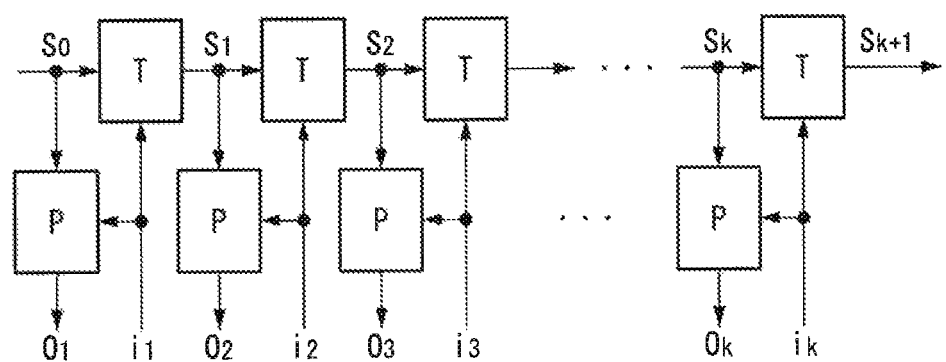
FIG. 5 is a view illustrating a sequential operation of finite-state-machines (FSM) according to an embodiment to which the present invention is applied.

FIG. 5 is a view illustrating a sequential operation of finite-state-machines (FSM) according to an embodiment to which the present invention is applied.

An FSM refers to a device sequentially representing a change in limited states. For example, in this disclosure, machines known as mealy machines or mealy circuits used in a circuit design may be applied. Here, the FSM may be defined by tuple, and here, tuple may refer to finite ordered list of elements.

Referring to FIG. 5, S indicates states of a finite set, $S_0$ indicates an initial state, and $S_0 \in S$ is satisfied. When $\Sigma$ indicates a finite set of input alphabets and $\Lambda$ indicates a finite set of output alphabets, T indicates a state transition function, T: $S \times \Sigma \rightarrow S$ may be expressed, P indicates an output function, and P: $S \times \Sigma \rightarrow \Lambda$ may be expressed.

FIG. 5 illustrates a sequential operation of the FSM, in which $S_k \in S$, $i_k \in \Sigma$, and $O_k \in \Lambda$ are satisfied. The FSM may be one of basic elements used for concurrent computation. Since the FSM simply indicates a sequential process, calculation defined by the FSM is difficult to be parallelized, and in order to solve this, speculative execution is required.

In an embodiment to which the present invention is applied, functional units indicating a data model for segment entropy coding are changed to FSM functional units and applied to an entropy coding system.

Figure 6:
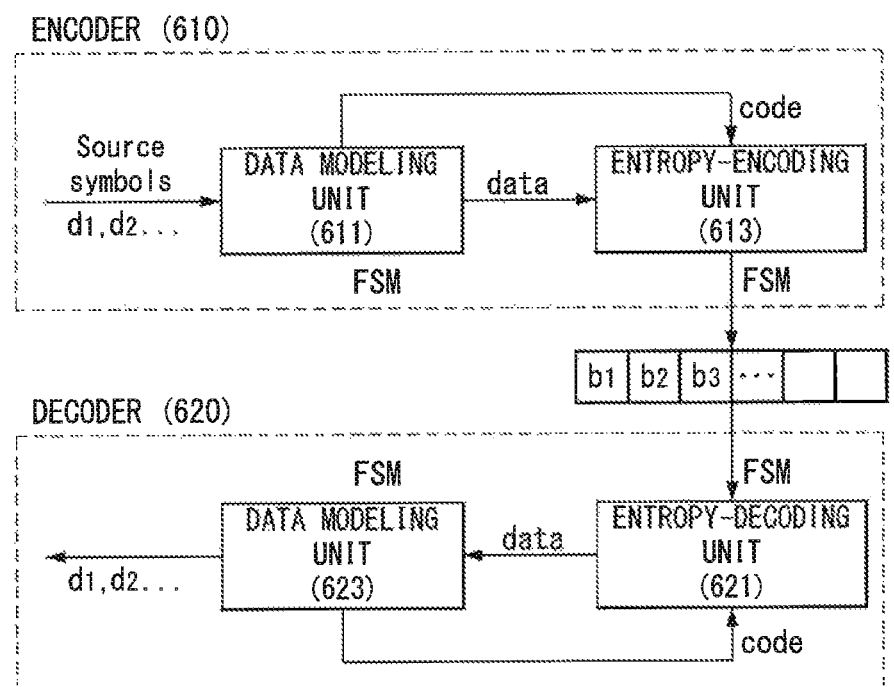
FIG. 6 is a schematic block diagram of an adaptive coding system regarding independent and identically distributed source symbols according to an embodiment to which the present invention is applied.

FIG. 6 is a schematic block diagram of an adaptive coding system regarding independent and identically distributed source symbols according to an embodiment to which the present invention is applied.

Entropy coding is a process expressing information without loss in a manner minimizing an average bit number in use, which is a basic part of compression in every form. Entropy coding may be performed in various manners and calculation complexity thereof tends to be basically increases by an amount that compression efficiency reaches a theoretical limitation.

FIG. 6 illustrates a basic diagram introducing entropy coding. In the present invention, it is assumed that sequential random data symbols are {d1, d2, d3, . . . } and source alphabets are $d_k \in \{0, 1, \ldots, M-1\}$. These are i.i.d. and coded to sequential binary symbols (bits) $\{b_1, b_2, b_3, \ldots\}$. This model is useful as an optimal method for coding an i.i.d. source. As discussed hereinafter, actual data sources are even more complicated but, in the present invention, these may be used as basic elements in a more complicated coding system.

An optimal code is determined by a symbol probability set $\{p_0, p_1, \ldots, p_{M-1}\}$. For ideal compression, an average bit number used in a coding symbol $d_k$ is expressed by Equation 1 below.

$$b_k = p_{d_k} \log_2\left(\frac{1}{p_{d_k}}\right) \text{ bits} \qquad \text{[Equation 1]}$$

In general, an average bit number used for the coding symbol $d_k$ is not an integer. In the past, each symbol was easily coded using an integer bit number, and thus, prefix codes (Huffman, Golomb-Rice, Elias-Teuhola, etc) have been used in actual compression application. However, the prefix codes have been replaced by arithmetic codes which are almost accurately expressed by the bit number of Equation 1 on average although they are more complicated in terms of calculation.

Referring to FIG. 6, an adaptive coding system to which the present invention is applied may include an encoder 610 and a decoder 620. The encoder 610 includes a data modeling unit 611 and an entropy-encoding unit 613, and the decoder 620 may include an entropy-decoding unit 621 and a data modeling unit 623. Here, for parallelization of entropy coding, each function unit of the adaptive coding system may be an FSM.

The data modeling unit 611 may receive source symbols $(d_1, d_2, \ldots)$, estimate a symbol probability, and dynamically update a code to manage a data model.

The entropy-encoding unit 613 performs entropy-encoding on the basis of data and code information received from the data modeling unit 611 and calculates a compressed data bit array $(b_1, b_2, \ldots)$.

The entropy-decoding unit 621 receives the compressed data bit array $(b_1, b_2, \ldots)$, performs entropy-decoding thereon, and transmits entropy-decoded data to the data modeling unit 623.

The data modeling unit 623 may output a source symbol on the basis of the received data, generates a code, and transmits the generated code to the entropy-decoding unit 621.

In another embodiment to which the present invention is applied, even when codes are fixated, a coding process may be divided into code selection and actual coding.

In an embodiment of the present invention, it is possible to parallelize an FSM present in a relatively simple and small state space, but, in order to obtain high data throughput and optimally perform compression, a complicated FSM present in a large scale state space is required to be used.

A state machine for data modeling is devised to count generation of each symbol to basically estimate a probability thereof. Transforms based on a source alphabet size (M) exist or a greater weight value is required to be provided to more recent events, but, for effective compression, a state space should be sufficiently large all the time.

In a system using a code as an integer bit number per symbol, an entropy-coding FSM has a state of tracking a position in a compressed data bit array. Since an arithmetic coder is used to represent fractional numbers of pending bits in a sense, it includes an FSM having a larger state space. For example, in order to code sequential symbols using 1.732 and 0.647 bits, the coder may subtract 1 bit behind a first symbol and change a state thereof to represent a 0.732 pending bit. Next, the coder may subtract a second bit behind a second symbol and update an internal state representing 0.379 remaining bits.

While such simple systems such as those of FIG. 6 show basic blocks of a more complicated compression system, inter-relationship exists between a large number of FSMs in actual media compression. Thus, for a substantial purpose, in the present invention, it is assumed that an FSM state space is large and each state is dependent upon already encoded or decoded every symbol.

In an embodiment to which the present invention is applied, entropy-coding may multiplex and demultiplex every distinguished data elements, in addition to effectively expressing data.

In general, when a signal is processed, it is transformed and decomposed into numerous sub-elements and has coding requirements, data alphabets, and statistical characteristics. In an enhanced encoding method, decomposition and transform type may be changed during a coding process and parameters may be adjusted according to signal characteristics in each segment.

Also, in order to optimize compression, entropy-coding should be applied to every information added to a compressed data bit array, although it is insignificant.

Figure 7:
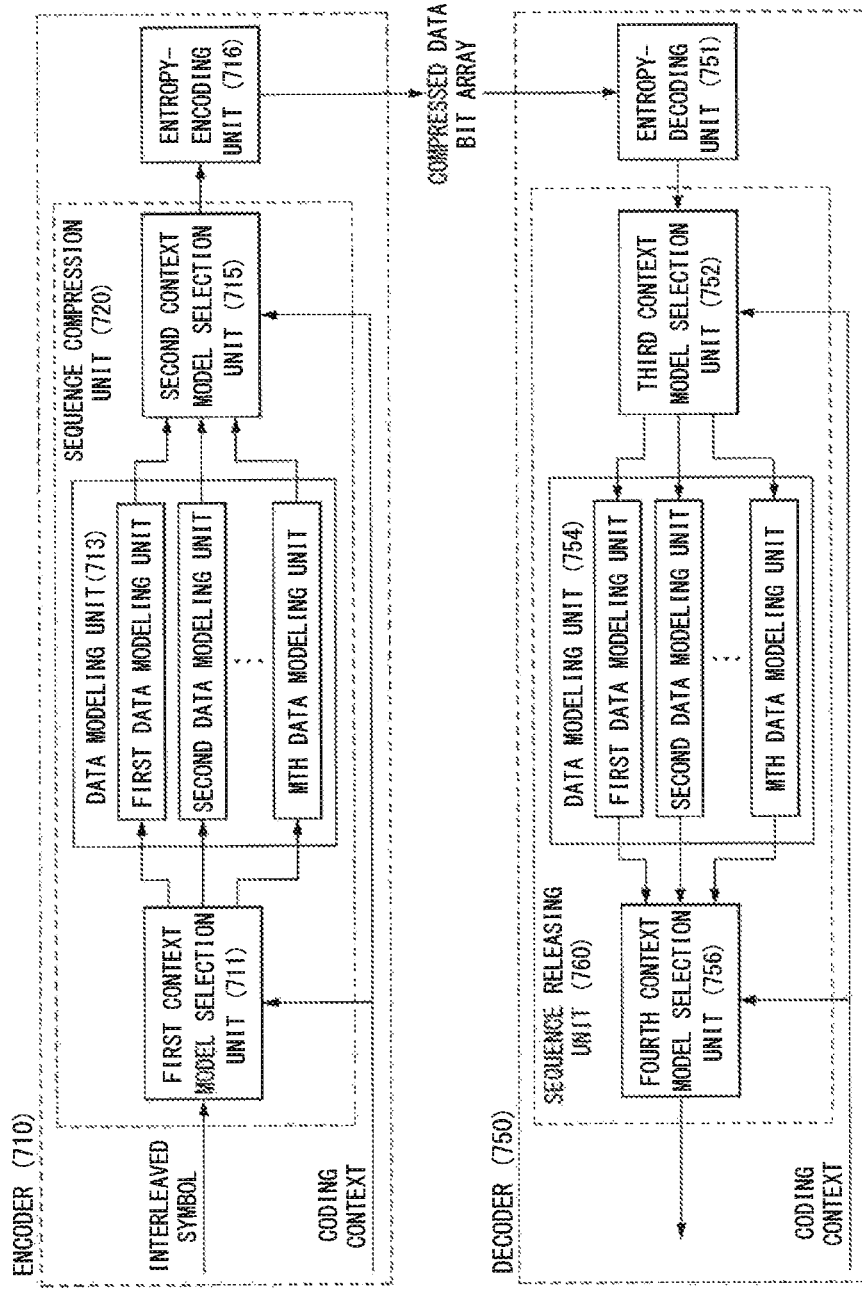
FIG. 7 is a schematic block diagram of a coding system performing compression by applying different data models to data types according to an embodiment to which the present invention is applied.

FIG. 7 is a schematic block diagram of a coding system performing compression by applying different data models to data types according to an embodiment to which the present invention is applied.

An encoder 710 of FIG. 7 may include a sequence compression unit 720 and an entropy-encoding unit 716, and the sequence compression unit 720 may include a first context model selection unit 711, a data modeling unit 713, and a second context model selection unit 715.

The decoder 750 may include a sequence releasing unit 760 and an entropy-decoding unit 751, and the sequence releasing unit 760 may include a third context model selection unit 752, a data modeling unit 754, and a fourth context model selection unit 756.

FIG. 7 illustrates a way in which a multiplexing process is expressed in the present invention.

First, referring to a performing process of the encoder 710, the sequence compression unit 720 forms m number of different sequences $\{s_{t1}, s_{t2}, s_{t3}, \ldots\}$ for interleaved data symbols, structures the sequences according to types $t \in \{1, 2, \ldots m\}$ thereof. Data samples are estimated as i.i.d. having a specific probability distribution. Each element of the sequences are introduced to the entropy-encoding unit 716 according to an original order but data types may be randomly changed. The entropy-encoding unit 716 may perform entropy-encoding on input elements and output a compressed data bit array.

The first context model selection unit 711 may select a context model corresponding to interleaved symbols input on the basis of a coding context.

The data modeling unit 713 may include data modeling units respectively corresponding to the m number of sequences, and each data modeling unit may perform data modeling corresponding to each sequence on the basis of a selected context model.

The second context model selection unit 715 may select an appropriate context model for data corresponding to each sequence on the basis of a coding context.

Referring to a performing process of the decoder 750, the entropy-decoding unit 751 may receive a compressed data bit array and perform entropy-decoding thereon.

The sequence releasing unit 760 may decompress the entropy-decoded data bit array. A third context model selection unit 752, a data modeling unit 754, and a fourth context model selection unit 756 of the sequence releasing unit 760 performs a reverse process of the process performed by the sequence compression unit 720 of the encoder 710, and thus, a detailed description thereof will be omitted.

The encoder and the decoder share an algorithm defining in which sequence different data types are encoded according to a compression standard syntax. Here, the algorithm may be modeled to an FSM. Since order thereof is dependent upon encoded data, a strict causal relationship is required. For example, the encoder may select an execution path on the basis of data available in the decoder in a corresponding stage.

In the present invention, it is assumed that a data model and a coding context are in a 1:1 relationship. For example, the coding context may refer to a context regarding how data is generated and how data is coded. This is important because a data model is completely self-contained and coding characteristics thereof are defined only by the FSM thereof. Here, the coding characteristics should not be confused with compression efficiency and may be dependent upon which data model is used.

In an embodiment of the present invention, when different models are generated under different contexts for the purpose of enhanced compression, the different models may be used for the same type of coding data. This is because symbols may have different probability sets. Under this assumption, the context model selection units illustrated in FIG. 7 represent context switching.

Figure 8:
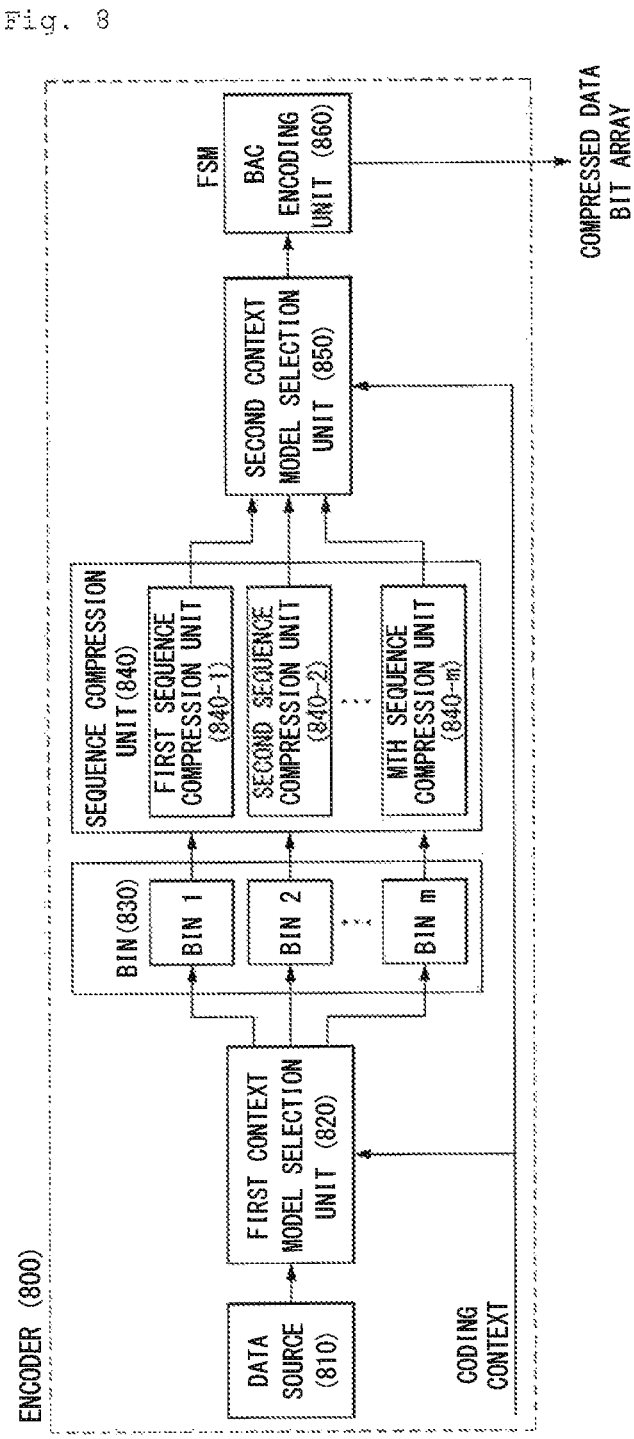
FIGS. 8 and 9 are schematic block diagrams of a coding system illustrating a data flow for binary arithmetic coding according to embodiments to which the present invention is applied.
Figure 9:
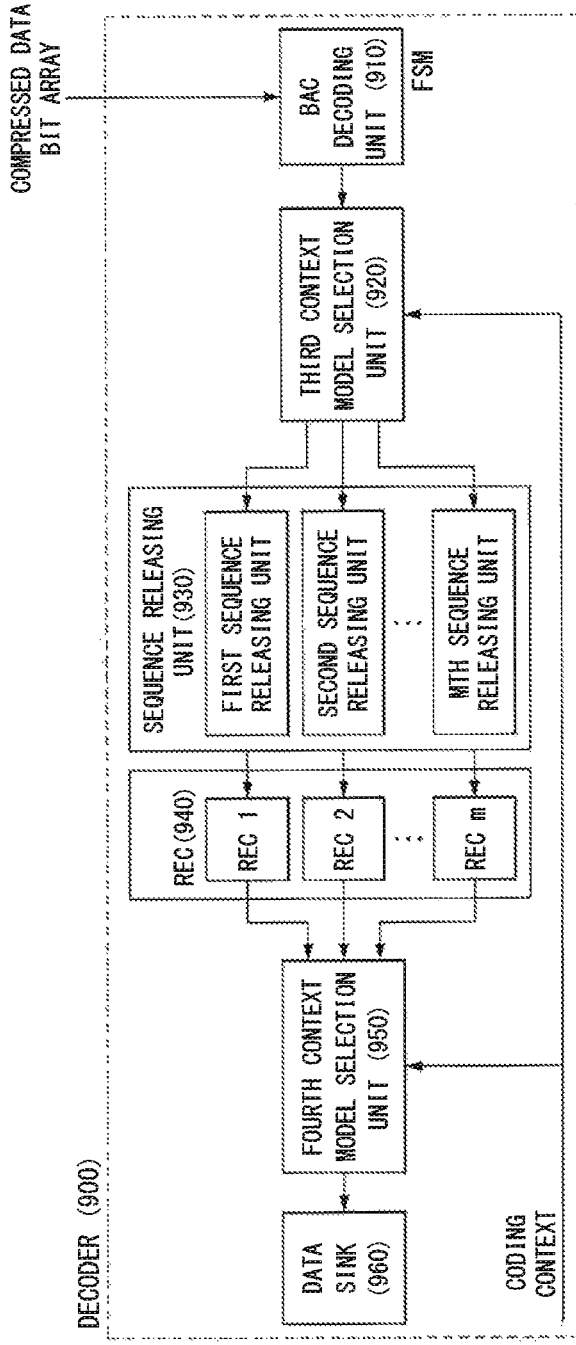

FIGS. 8 and 9 are schematic block diagrams of a coding system illustrating a data flow for binary arithmetic coding according to embodiments to which the present invention is applied.

In order to analyze an entropy coding structure of the current video compression standard, an already existing structure may be used. It represents the most important required type.

A diagram having most important entropy coding elements is illustrated in FIG. 8.

Referring to FIG. 8, an encoder 800 may include a data source block 810, a first context model selection unit 820, a BIN 830, a sequence compression unit 840, a second context model selection unit 850, and a binary arithmetic coding (BAC) encoding unit 860. Here, the contents of FIG. 7 may be applied to the sequence compression unit 840.

Referring to FIG. 9, a decoder 900 may include a binary arithmetic coding (BAC) decoding unit 910, a third context model selection unit 920, a sequence releasing unit 930, an REC 940, a fourth context model selection unit 950, and a data sink block 960. Here, the contents of FIG. 7 may be applied to the sequence releasing unit 930.

First, the data source block 810 may correspond to signal decomposition and signal transform function units. That is, the data source block 810 is a part generating control and data signal introduced to the entropy encoder.

The first context model selection unit 820 may control a multiplexing operation by selecting a different entropy coding data model (coding context) on the basis of a coding context.

Data extracted from non-binary alphabets undergoes a binarization process through the BIN 830 and form m number of different sequences $\{s_{t1}, s_{t2}, s_{t3}, \ldots\}$ through the sequence compression unit 840.

The second context model selection unit 850 may select a context model appropriate for data corresponding to each sequence on the basis of a coding context.

The BAC encoding unit 860 may perform binary arithmetic coding on the basis of the selected context model to output a compressed data bit array.

Meanwhile, the BAC decoding unit 910 of the decoder 900 may receive the compressed data bit array and perform binary arithmetic decoding thereon.

The third context model selection unit 920, the sequence releasing unit 930, and the fourth context model selection unit 950 perform a reverse process of the process performed by the first context model selection unit 820, the sequence compression unit 840, and the second context model selection unit 850, and thus, a detailed description thereof will be omitted.

Also, the REC 940 reconstructs data binarized through the BIN 830 of the encoder.

The data sink block 960 may correspond to inverse-transform and signal reconstruction function units. The data sink block 960 shares a rule required for demultiplexing and selecting an appropriate data model and data with the encoder. Also, the data sink block 960 may provide information required for extracting data from the compressed data bit array to the entropy decoder.

The diagrams of FIGS. 8 and 9 illustrate how different data elements are multiplexed.

Data extracted from non-binary alphabets should undergo a process called binarization. In FIGS. 8 and 9, binarization is performed by the BIN blocks (BIN 1, BIN 2, . . . , BIN n) and returned to the original state by REC blocks. Here, the BIN blocks may be different from each other. The reason is because the BIN blocks (BIN 1, BIN 2, . . . , BIN n) are used for alphabets having different sizes and use different binarization strategies.

Thereafter, the same process as illustrated in FIG. 6 may be used for each binary symbol (bin). For example, each binary symbol (bin) may be transmitted as a data model for probability estimation and code generation.

One important part is that FIGS. 8 and 9 show a logical relationship, instead of a temporal data flow. For example, each data symbol generates a variable of a binary symbol. In addition, blocks shown as parallel data paths may be multiplexed and may be sequentially performed all the time.

In the present invention, it may be confirmed that, in FIGS. 8 and 9, entropy coding is defined by four layers (model selection unit, BIN/REC, data modeling unit, BAC encoding/decoding unit) of inter-related finite state machines.

In FIGS. 8 and 9, the context model selection units may perform high level multiplexing of data types and coding contexts.

The BIN 830 and the REC 940 may perform binarization and recovery process applied to every non-binary symbol, respectively.

Also, the data modeling unit may perform data modeling to estimate a probability of binary symbols.

The BAC encoding unit and the BAC decoding unit may perform entropy coding to generate or interpret compressed data bits.

The diagrams of FIGS. 8 and 9 are shown to be slightly complicated but they are simplified versions include numerous execution details and applied to a compression coding system.

In consideration of calculation complexity and parallelization option, the following facts may also be considered in the present invention.

First, due to the complexity in the past, data is always split into binary symbols, while adding one or more sequential processes in a recent standard. Simplifying calculation and increasing a clock frequency of a processor are meaningful when cost is low, but it may not be so in the present invention.

Second, currently, data throughput is limited by the number of entire clock cycles required for classifying or splitting information into smallest elements, rather than being limited by high complexity for coding each binary symbol. Also, the information is multiplexed and coded.

Third, a pseudo-random method updating an FSM makes it difficult to identify which elements are able to perform independent execution. Since multiplexing order is forced by a compressed data format (syntax), it may be changed.

Fourth, parallelization is performed within a small FSM blocks. However, since small FSM blocks do not incur high cost individually, it may be difficult to obtain a substantial performance gain.

In the present invention, when media data is split into independent parts, the same type of entropy coding may not be performed unless a state of a data model is known. If a data model is reset instead, data models may lose required information and compression performance may be resultantly reduced. As mentioned above, an alternative method is to perform speculative execution. This, however requires a large state space and sacrifices a valuable resource (power, cores, silicon, etc.).

Figure 10:
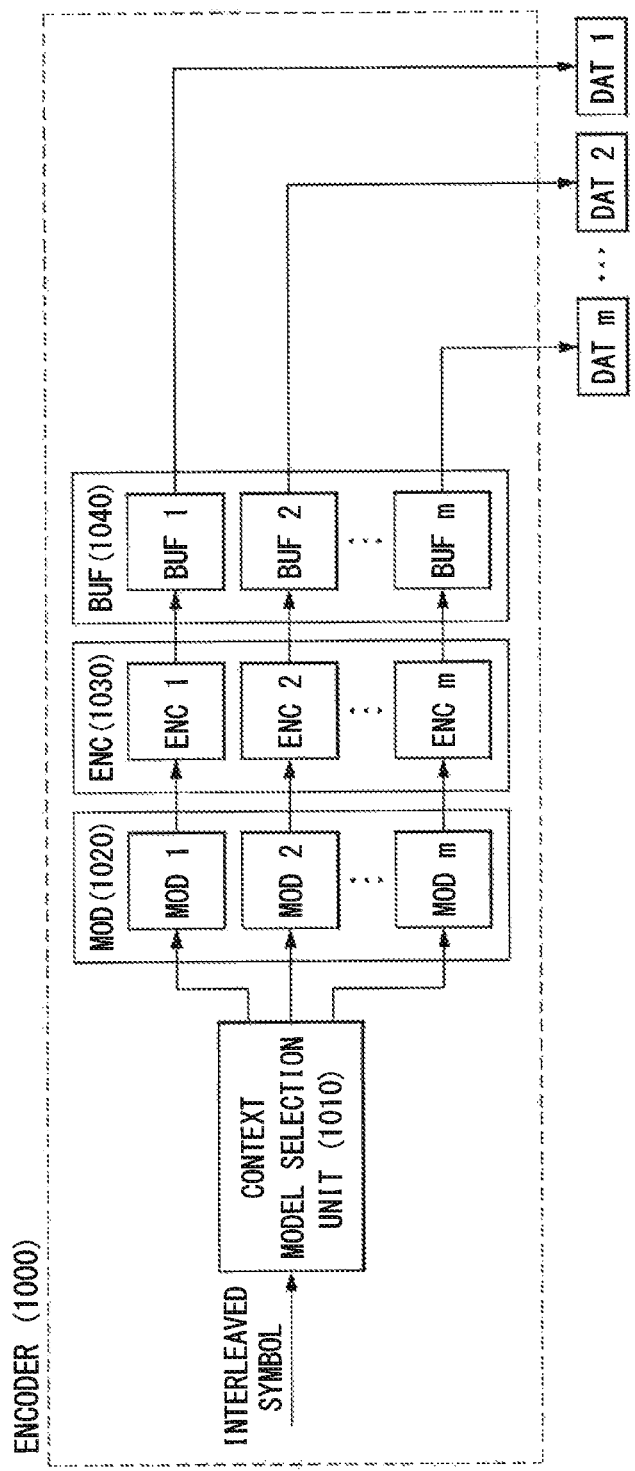
FIGS. 10 and 11 are schematic block diagrams of a multiplexed coding system performing the same compression as those of FIGS. 8 and 9, according to embodiments to which the present invention is applied.
Figure 11:
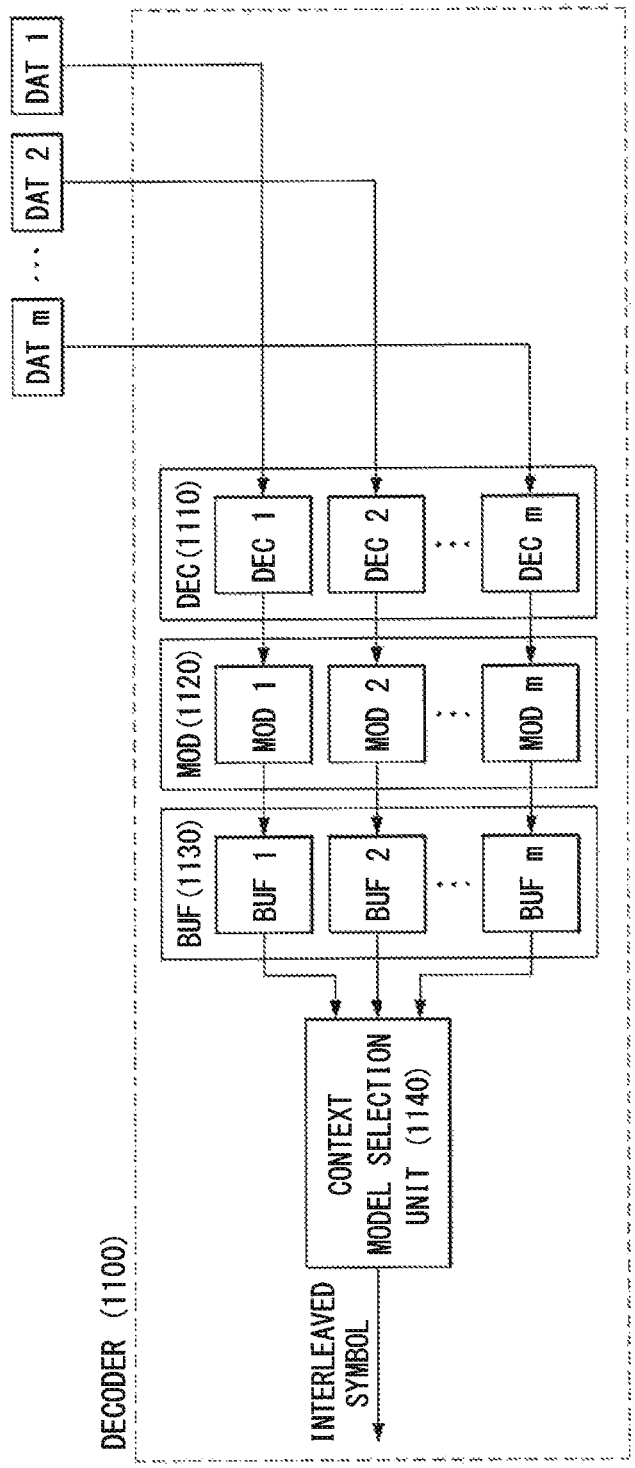

FIGS. 10 and 11 are schematic block diagrams of a multiplexed coding system performing the same compression as those of FIGS. 8 and 9, according to embodiments to which the present invention is applied.

A method for performing parallelization to which, the present invention is applied uses a fact that is obtained by removing data dependency when a new compression algorithm is designed. However, this may negatively affect compression. Thus, the present invention proposes a method for discovering and removing unessential dependency.

In other calculation problems, characteristics such as associativity and commutativity are used to change operation order and generate a new type of parallel execution. Features that may be used in entropy coding may be a fact that optimal compression is made as long as each data symbol is expressed using an optimal bit number. It is not important where such bits are accurately placed, except some semantic limitations.

An encoder 1000 of FIG. 10 may include a context model selection unit 1010, a MOD 1020, an ENC 1030, and a BUF 1040, and a decoder 1100 of FIG. 11 may include a DEC 1110, a MOD 1120, a BUF 1130, and a context model selection unit 1140.

The context model selection unit 1010 may select a context model corresponding to interleaved symbols input on the basis of a coding context.

Data modeling is performed on each sequence formed on the basis of the selected context model through the MOD 1020, sequence compression is performed through the ENC 1030, and resultant data may be stored in the BUF 1040. The data compressed through such a process may be stored in separate blocks DAT 1, DAT 2, . . . , DAT m.

For example, when multiplexed compression of FIG. 7 is performed as illustrated in FIG. 10, the sum of bits used by every encoder may be accurately the same as that of bits used by a single encoder. Due to due to details such as overhead substantially due to a data structure or generation of a file by full bytes, there may be a slight difference, but such a difference may not be important if compressed data blocks are sufficiently large.

The encoder 1000 of FIG. 10 completely removes dependency between a sequence within data added to a single compressed data array and update within a data model.

In the present invention, since compressed data is stored in split data segments, which is called segment entropy coding, and such an approach provides better flexibility in defining execution order and allows for large scale parallelization.

For example, the decoder 1100 of FIG. 11 may perform every entropy-decoding on separate blocks DAT 1, DAT 2, . . . , DAT m using each parallel processor through the DEC 1110 and store every data symbol in the BUF 1130 through the MOD 1120.

Also, the context model selection unit 1140 performs a reverse process of the process performed by the context model selection unit 1010 of the encoder 1000, and thus, a detailed description thereof will be omitted.

Thereafter, when the decoder 1100 performs entire media decompression and accesses symbols within an appropriate sequence, the symbols may not required to be completely entropy-coded from a binary expression thereof but may be effectively read from the buffer.

Thereafter, in the present invention, parallel implementations may be used as the encoder buffers data symbols. In both two cases, in the present invention, the same type of trade-off regarding the access may be discovered. A method for parallelizing entropy coding may be discovered at cost of using more memories without causing any compression loss.

Delay for data processing may become an important issue in the future, and thus, a system considering a cache operation is intended to be designed in the present invention.

Figure 12:
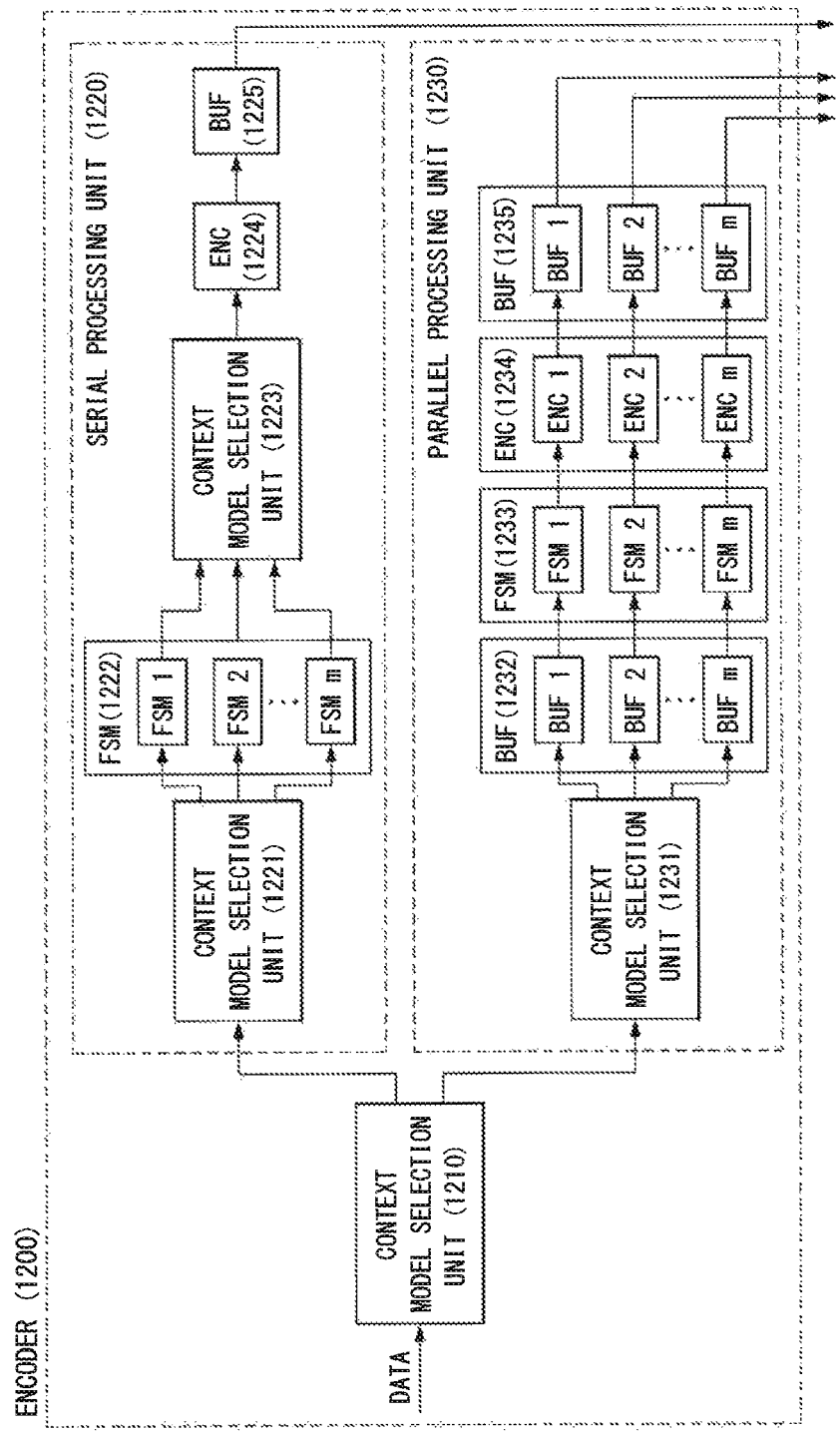
FIGS. 12 and 13 are schematic block diagrams of an entropy coding system performing parallel implementations according to embodiments to which the present invention is applied.
Figure 13:
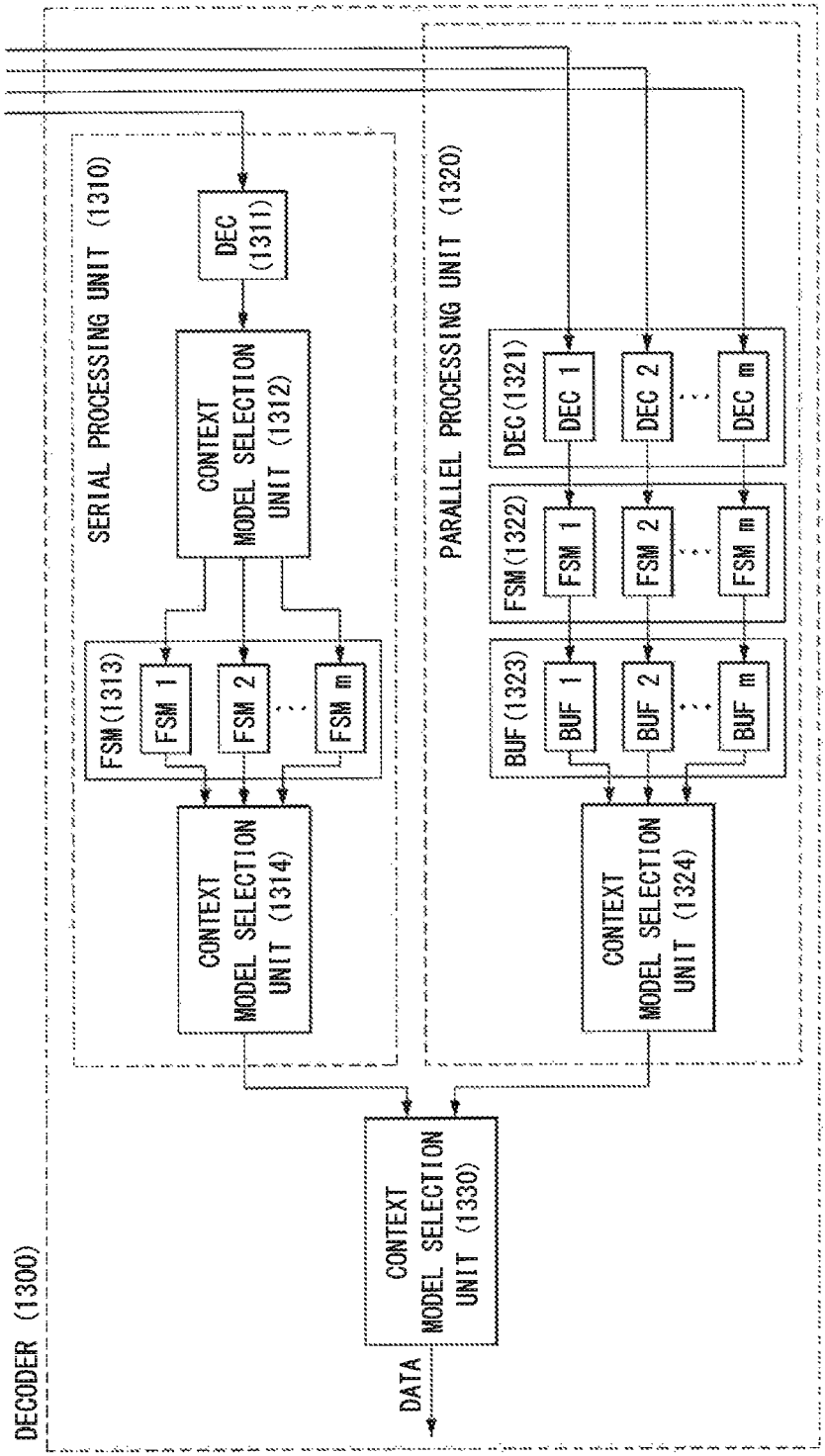

FIGS. 12 and 13 are schematic block diagrams of an entropy coding system performing parallel implementations according to embodiments to which the present invention is applied.

In order to perform adaptive parallel implementations, an FSM design is required through an input of determining a parallel state and a change in a parallel state. In the input of determining a state of parallel implementations, a syntax element including one bin, while generating branching with a syntax element to be decoded may be defined as 1 and a syntax element not generating branching may be defined as 0. An output of an FSM may refer to the number of syntax elements to be decoded. For example, it may refer to the number of context models to be calculated in parallel.

The encoding/decoding sequences of FIGS. 12 and 13 to which the present invention is applied may be re-arranged to generate segmented compressed data arrays.

An encoder 1200 of FIG. 12 may include a context model selection unit 1210, a series processing unit 1220, and a parallel processing unit 1230. Here, the series processing unit 1220 may include a context model selection unit 1221, an FSM 1222, a context model selection unit 1223, an ENC 1224, and a BUF 1225. The parallel processing unit 1230 may include a context model selection unit 1231, a BUF 1232, an FSM 1233, an ENC 1234, and a BUF 1235.

The decoder 1300 of FIG. 13 may include a series processing unit 1310, a parallel processing unit 320, and a context model selection unit 1330. Here, the series processing unit 1310 may include a DEC 1311, a context model selection unit 1312, an FSM 1313, and a context model selection unit 1314. The parallel processing unit 1320 may include a DEC 1321, an FSM 1322, a BUF 1323, and a context model selection unit 1324.

A more general system for segment entropy coding is illustrated in FIGS. 12 and 13. The system of FIGS. 12 and 13 is similar to the basic system of FIGS. 10 and 11, but it includes some important elements in a substantial application. Thus, the same descriptions of FIGS. 10 and 11 may be applied to functional units illustrated in FIGS. 12 and 13 and only different parts will be described hereinafter.

In FIGS. 12 and 13, it is noted that blocks representing data models (MOD) are changed into FSM 1313 and 1322 blocks. This is because the corresponding technique properly operates in any type of self-contained FSM. For example, the blocks may represent a corresponding binary data model, as well as a binarization process.

In order to avoid too small segments not requiring parallelization, it is assumed that the present invention includes base segments (series processing units 1220 and 1310) and data thereof is processed through serial execution as a general method.

Since decoding elements should use data from other segments, a decoder should know positions where data segments start. For example, this may be performed using a data format having a header including a pointer regarding start of each data segment as illustrated in FIG. 14.

Figure 14:
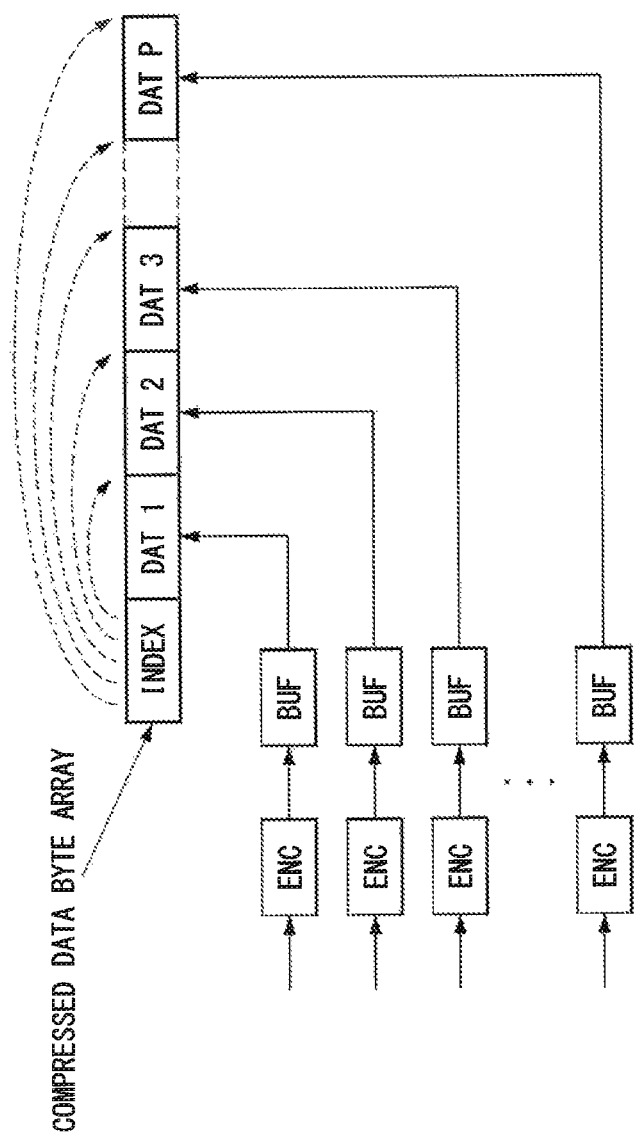
FIG. 14 is a view illustrating a structure of a compressed data array split into independent segments according to an embodiment to which the present invention is applied.

FIG. 14 is a view illustrating a structure of a compressed data array split into independent segments according to an embodiment to which the present invention is applied.

A header of segment data to which the present invention is applied may include a pointer (index) assigned to each segment.

Referring to FIG. 14, a compressed data byte array includes an index on the forefront and includes subsequent segment data. For example, the segment data may be expressed as DAT 1, DAT 2, . . . , DAT P.

That is, each data may be coded through each ENC block and stored in each BUF block, and a compressed byte array may be generated therefrom.

Figure 15:
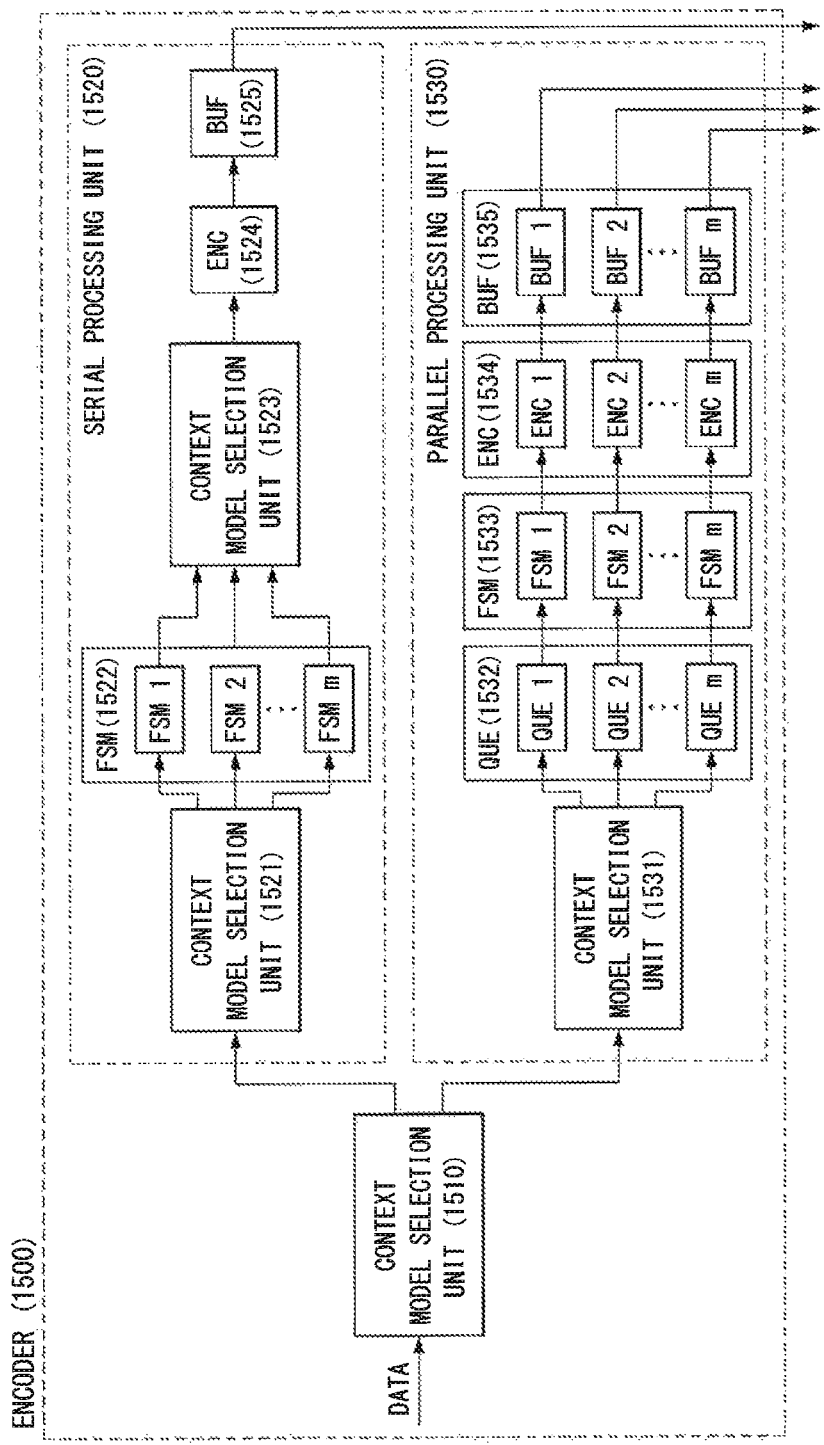
FIGS. 15 and 16 are schematic block diagrams of a coding system performing parallel implementations using a data queue according to embodiments to which the present invention is applied.
Figure 16:
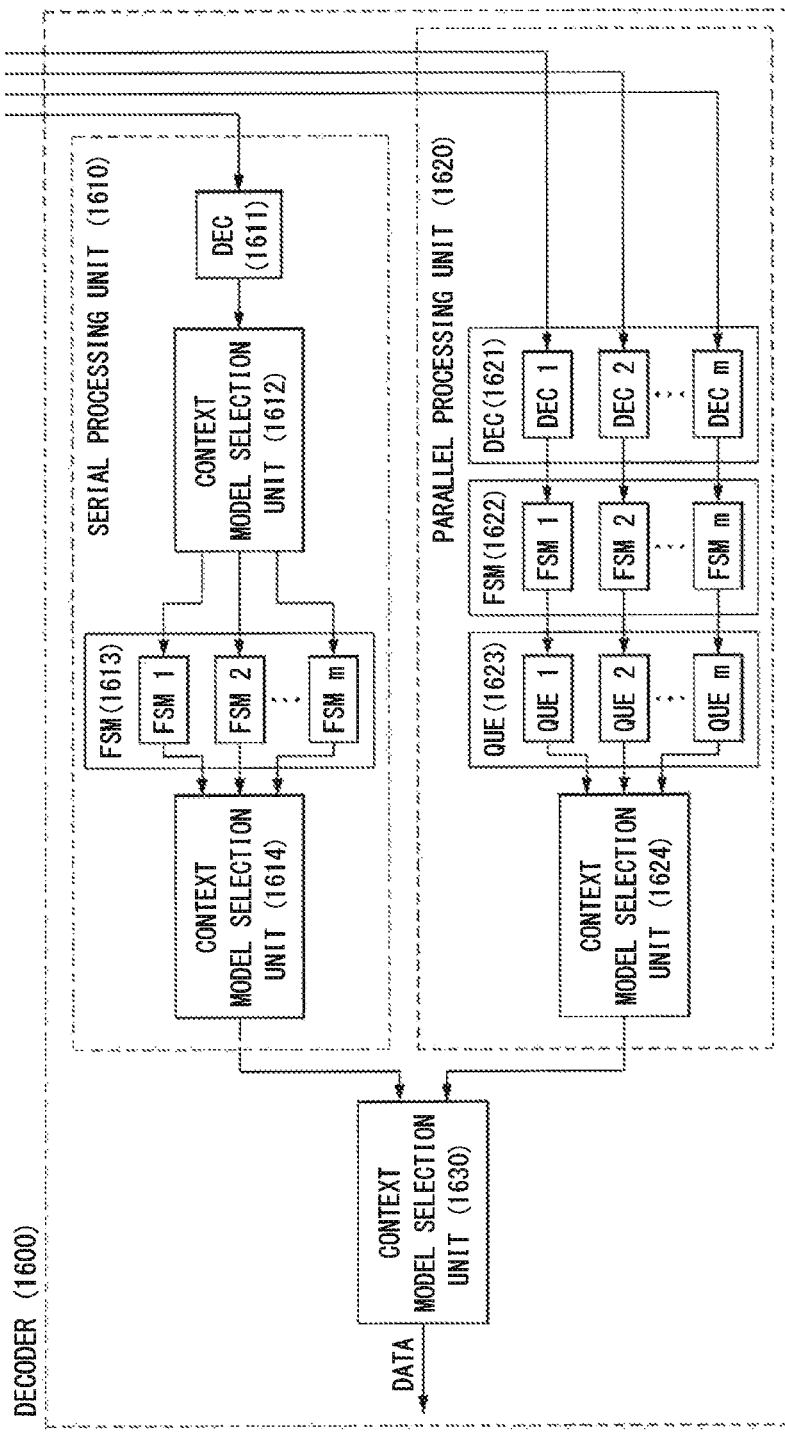

FIGS. 15 and 16 are schematic block diagrams of a coding system performing parallel implementations using a data queue according to embodiments to which the present invention is applied.

An encoder 1500 of FIG. 15 may include a context model selection unit 1510, a series processing unit 1520, and a parallel processing unit 1530. Here, the series processing unit 1520 may include a context model selection unit 1521, an FSM 1522, a context model selection unit 1523, an ENC 1524, and a BUF 1525. The parallel processing unit 1530 may include a context model selection unit 1531, a QUE 1532, an FSM 1533, an ENC 1534, and BUF 1535.

A decoder 1600 of FIG. 16 may include a series processing unit 1610, a parallel processing unit 1620, and a context model selection unit 1630. Here, the series processing unit 1610 may include a DEC 1611, a context model selection unit 1612, an FSM 1613, and a context model selection unit 1614. The parallel processing unit 1620 may include a DEC 1621, an FSM 1622, a QUE 1623, and a context model selection unit 1624.

The same descriptions of FIGS. 12 and 13 may be applied to functional units illustrated in FIGS. 15 and 16 and only different parts will be described hereinafter. In FIGS. 15 and 16, it is noted that BUF 1232 and 1323 blocks are changed into QUE 1632 and 1623 blocks.

An encoder/decoder performed in software may use thread-based parallelization using a general processor including some cores. Here, since thread generation is relatively costly, it is assumed that the number of threads smaller than numerous data segments is provided. This may be possible by using a thread pool.

For example, the encoder may be performed as follows.

First, when the encoder 1500 processes media and generates a data symbol to be encoded, data symbols present in a base segment are immediately encoded, while data symbols in other segments may be simply coped to a buffer.

Second, after media processing is finished, the decoder may use a plurality of threads to encode the buffered data in parallel. A load-balancing algorithm may be used to assign segments to other threads.

Third, when every data is compressed, the encoder may generate a compressed data header and concatenate all segments to generate a single data array.

Thread-level parallelization of decoding is performed similarly, but in different order.

First, the decoder reads the compressed data header and starts to decode every segment except a base segment using multiple threads. Also, the decoder stores decoded symbols in a buffer.

Thereafter, the decoder performs media processing and decompression. If required data symbols are within the base segment, the data symbols are immediately decoded, or otherwise, the data symbols are simply read from the buffer.

A problem of such an approach is that, as illustrated in FIGS. 12 and 13, in order to combine the buffers BUF 1 to BUF m of the parallel processing unit 1230 to a parallel path, every non-compressed data to be processed in parallel is required to be stored. If the data is not compressed, a memory greater than the buffer for temporarily storing compressed data is required.

Referring to FIGS. 15 and 16, it is illustrated that how the present invention solves the excessive data buffering problem. For example, this may be performed by changing a large buffer into smaller data queues (QUE) 1532.

In hardware designed for encoding/decoding, the present invention does not require the same high cost for starting or synchronizing threads. Thus, a data flow access may be adopted, and here, the encoder may start non-blocking processing of data immediately when assigned to a data segment, or add a short queue for post-processing. If a queue is not full, the other remaining operations for generating data may continue in parallel.

Similarly, in the decoder 1600, hardware starts to simply decode data segments, and instead of decoding the entire segments, when a queue is not full, the decoded symbols may be written into the queue any time. Here, if the queue is not empty, execution of other operations may continue.

Since the main algorithm (the data source and sink of FIGS. 12 and 13) generates or consumes data of sequences transmitted to other data segments (even the same type of data due to a different coding context), in the present invention, some elements may be provided during parallel implementations, and since the encoder is full or the decoder has an empty queue, it has no choice but to execute relying on series.

Figure 17:
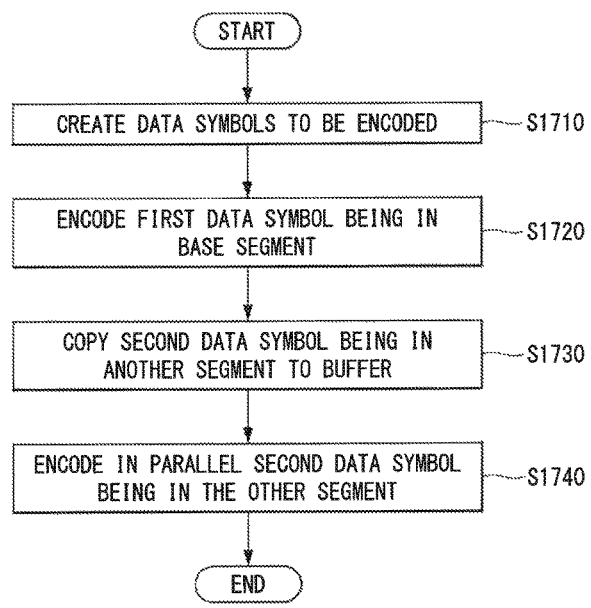
FIG. 17 is a flow chart illustrating a method for encoding a video signal using parallel implementations according to an embodiment to which the present invention is applied.

FIG. 17 is a flow chart illustrating a method for encoding a video signal using parallel implementations according to an embodiment to which the present invention is applied.

First, a data symbol generation unit (not shown) of an encoder may generate data symbols to be encoded (S1710).

The encoder may encode a first data symbol being in a base segment (S1720). Here, step S1720 may be performed by a series processing unit.

The encoder may copy a second data symbol being in another segment to a buffer (S1730). Here, a load-balancing algorithm may be used to assign segments to different threads. In another embodiment, a non-blocking process may start when assigned to a data segment.

The encoder may encode in parallel the second data symbol being in the other segment (S1740). Here, step S1730 and S1740 may be performed by a parallel processing unit.

Thereafter, a data bit array generation unit (not shown) may generate a compressed data header when every data is compressed. Here, the compressed data header may include an index of each segment.

Also, the data bit array generation unit may concatenate all segments to generate a single data array.

FIG. 18 is a flow chart illustrating a method for decoding a video signal on the basis of parallel implementations according to an embodiment to which the present invention is applied.

First, a decoder may read each segment being in a compressed data header (S1810). Also, the decoder decodes all segments except a base segment using multiple threads (S1820) and store data symbols in a buffer (S1830). These steps may be performed by a parallel processing unit.

The decoder may decode the video signal on the basis of the data symbols (S1840).

Here, when the data symbols exist in the base segment, the data symbols in the base segment may be decoded.

Meanwhile, when the data symbols do not exist in the base segment, the data symbols may be read from a corresponding buffer.

As described above, the embodiments explained in the present invention may be implemented and performed on a processor, a micro processor, a controller or a chip. For example, functional units explained in FIGS. 1-4, FIGS. 6-13 and FIGS. 15-16 may be implemented and performed on a computer, a processor, a micro processor, a controller or a chip.

Furthermore, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to process video signals and data signals.

Furthermore, the processing method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a USB, ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

INDUSTRIAL APPLICABILITY

The exemplary embodiments of the present invention have been disclosed for illustrative purposes, and those skilled in the art may improve, change, replace, or add various other embodiments within the technical spirit and scope of the present invention disclosed in the attached claims.

The invention claimed is:

1. A method for encoding a video signal using parallel implementations, the method performed by at least one processor, comprising:
generating data symbols to be encoded, wherein the data symbols are assigned to a base segment and another segment;
encoding first data symbols in the base segment, wherein the first data symbols are encoded in serial by a serial processing using first probability information which is selected by a first context model selection unit in a serial processing block;
copying second data symbols in the another segment to a plurality of buffers in a parallel processing block which is connected in parallel to the serial processing block;
encoding the second data symbols in the parallel processing block, wherein each of the second data symbols are encoded in parallel by a parallel processing using second probability information which is selected by a second context model selection unit in the parallel processing block; and
creating a data header when the first data symbols and the second data symbols are encoded,
wherein the data header includes indexes of the base segment and the another segment.

2. The method of claim 1, wherein a load-balancing algorithm is used for assigning segments to different threads.

3. The method of claim 1, further comprising:
concatenating all segments to create a single data array.

4. The method of claim 1, wherein a non-blocking process starts when the data symbols are assigned to a data segment.

5. A method for decoding a video signal based on parallel implementations, the method performed by at least one processor, comprising:
reading data segments in a data header;
entropy-decoding first data symbols in a base segment of the data segments, wherein the first data symbols are decoded in serial by a serial processing using first probability information which is selected by a first context model selection unit in a serial processing block;
entropy-decoding second data symbols in all remaining data segments except the base segment using multiple threads,
wherein the second data symbols are read from a plurality of buffers in a parallel processing block which is connected in parallel to the serial processing block, and wherein each of the second data symbols are decoded in parallel by a parallel processing based on second probability information which is selected by a second model selection unit in the parallel processing block; and reconstructing the video signal based on the first data symbols and the second data symbols.

6. An apparatus for encoding a video signal using parallel implementations, the apparatus comprising:

at least one processor configured to:

generate data symbols to be encoded, wherein the data symbols are assigned to a base segment and another segment;

encode first data symbols in the base segment, wherein the first data symbols are encoded in serial by a serial processing using first probability information which is selected by a first context model selection unit in a serial processing block;

copy second data symbols in the another segment to a plurality of buffers in a parallel processing block which is connected in parallel to the serial processing block;

encode the second data symbols in the parallel processing block, wherein each of the second data symbols are encoded in parallel by a parallel processing using second probability information which is selected by a second context model selection unit in the parallel processing block; and create a data header when the first data symbols and the second data symbols are encoded, wherein the data header includes indexes of the base segment and the another segment.

7. The apparatus of claim 6, wherein a load-balancing algorithm is used for assigning segments to different threads.

8. The apparatus of claim 6, wherein the at least one processor is further configured to concatenate all segments to create a single data array.

9. The apparatus of claim 6, wherein a non-blocking process starts when the data symbols are assigned to a data segment.

10. An apparatus for decoding a video signal based on parallel implementations, the apparatus comprising:

at least one processor configured to:

read data segments in a data header;

entropy-decode first data symbols in a base segment of the data segments, wherein the first data symbols are decoded in serial by a serial processing using first probability information which is selected by a first context model selection unit in a serial processing block;

entropy-decode second data symbols in all remaining data segments except the base segment using multiple threads, wherein the second data symbols are read from a plurality of buffers in a parallel processing block which is connected in parallel to the serial processing block, and wherein each of the second data symbols are decoded in parallel by a parallel processing based on second probability information which is selected by a second model selection unit in the parallel processing block; and reconstruct the video signal based on the first data symbols and the second data symbols.

* * * * *